(12) United States Patent
Barlow et al.

(10) Patent No.: US 6,810,479 B1
(45) Date of Patent: *Oct. 26, 2004

(54) SYSTEM AND METHOD FOR CONFIGURING AND MANAGING RESOURCES ON A MULTI-PURPOSE INTEGRATED CIRCUIT CARD USING A PERSONAL COMPUTER

(75) Inventors: Doug Barlow, Redmond, WA (US); Blair Dillaway, Redmond, WA (US); Barbara Fox, Seattle, WA (US); Terry Lipscomb, Bellevue, WA (US); Terrence Spies, Kirkland, WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/492,882

(22) Filed: Jan. 26, 2000

Related U.S. Application Data

(63) Continuation of application No. 08/647,199, filed on Mar. 11, 1996, now Pat. No. 6,038,551.

(51) Int. Cl.[7] .............................. H04K 1/00; H04L 9/00; G06F 17/60; G06F 11/30; G06F 12/14
(52) U.S. Cl. ........................... 713/185; 713/193; 705/66
(58) Field of Search ............................. 705/52, 65, 41, 705/66; 713/172, 193, 165, 192, 194, 200, 173, 185; 340/5.28; 380/278, 277, 52, 266, 286; 235/380, 492, 379; 709/223

(56) References Cited

U.S. PATENT DOCUMENTS 5,036,461 A  7/1991  Elliott et al. ................... 705/44
5,468,947 A * 11/1995  Danielson et al. ...... 235/472.02
5,473,690 A * 12/1995  Grimonprez et al. ......... 705/65

(List continued on next page.)

FOREIGN PATENT DOCUMENTS

JP            08140944 A  *  6/1996  ............ A61B/5/00

OTHER PUBLICATIONS

Keizer, Gregg, "*Smart Cards: New Life in 1996*", Computer Life, vol. 3, No. 1, Jan. , 1996.
Piskora, Beth, "*High-Tech Alliance to Pursue More Smart Applications*", American Banker, vol. 160, No. 192, Oct. 5, 1995.
Block Valerie, "*Industry Visionaries See a On-Card Wallet*", American Banker, vol. 160, No. 90, May 11, 1995.

*Primary Examiner*—Gregory Morse
*Assistant Examiner*—Michael J. Simitoski
(74) *Attorney, Agent, or Firm*—Lee & Hayes, PLLC

(57) ABSTRACT

A computerized system offers a uniform platform for conducting electronic transactions in multiple different environments. The system includes a portable, multi-purpose, integrated circuit (IC) card and complimentary computer software which enables access and management of resources maintained on the IC card. The software runs on a user's personal computer, empowering the user to initialize the IC card, configure the card with the resources that the user wants to maintain on the card, and to manage those resources. The software enables the user to generate private/public key pairs and establish or change passcodes for access to the card resources. The IC card itself provides the electronic vehicle for securely transporting the user's private keys and certificates without exposing them in plaintext form. The IC card is designed with enough processing capabilities to perform rudimentary cryptographic functions so that the private keys may be employed for signing or encryption without ever being released from the card.

8 Claims, 12 Drawing Sheets

U.S. PATENT DOCUMENTS

| | | | | |
|---|---|---|---|---|
| 5,544,246 A | * | 8/1996 | Mandelbaum et al. | 705/65 |
| 5,577,121 A | | 11/1996 | Davis et al. | 380/24 |
| 5,590,038 A | | 12/1996 | Pitroda | 705/41 |
| 5,635,703 A | * | 6/1997 | Tanaka | 235/492 |
| 5,644,750 A | | 7/1997 | Iijima | 711/100 |
| 5,689,565 A | | 11/1997 | Spies et al. | 380/24 |
| 5,721,777 A | * | 2/1998 | Blaze | 380/286 |
| 5,742,756 A | * | 4/1998 | Dillaway et al. | 713/200 |
| 5,745,571 A | | 4/1998 | Zuk | 380/21 |
| 5,748,737 A | | 5/1998 | Daggar | 380/24 |
| 5,778,067 A | | 7/1998 | Jones et al. | 380/24 |
| 5,844,218 A | | 12/1998 | Kawan et al. | 235/380 |
| 6,012,634 A | * | 1/2000 | Brogan et al. | 235/380 |

* cited by examiner

SYSTEM AND METHOD FOR CONFIGURING AND MANAGING RESOURCES ON A MULTI-PURPOSE INTEGRATED CIRCUIT CARD USING A PERSONAL COMPUTER

This application is a continuation of application Ser. No. 08/647,199, filed Mar. 11, 1996, and now issued as U.S. Pat. No. 6,038,551 to Barlow, et al., and commonly assigned to the assignee of the present invention."

TECHNICAL FIELD

This invention relates to integrated circuit (IC) cards, such as smart cards, PC cards, and the like, which are capable of being used for multiple different applications. This invention further relates to systems and methods for initializing, configuring, and managing various resources maintained on the IC cards. This invention also relates to the secure management and transportation of cryptographic-related resources, such as keys and certificates, from one location to another.

BACKGROUND OF THE INVENTION

Computers are playing an ever increasing role in day-to-day personal management. Individual users keep appointment schedules, track bank and credit card accounts, manage investment portfolios, reserve travel accommodations, transact business, order products, and submit payment all electronically from their own computers. This revolution is being spawned by the combined phenomenon of rapid and wide deployment of personal computers in both business and home environments, explosive growth in interconnecting these personal computers to networks and online services, and dramatic increase in the deployment of retail terminals or kiosks based on PC technology.

As part of this trend, businesses have identified significant opportunities for electronic commerce, not only with other businesses, but also through direct access to the consumer. Merchants are selling wares in an electronic marketplace which enable users to shop and purchase goods using their computer. For instance, many merchants are developing web sites that allow users to browse products over the Internet. Payment and settlement following any purchase are likewise handled electronically among the merchants, their banks, any credit companies, and the purchasers' banks.

One consequence of this revolution is a growing demand for high data security and for high assurance in user identification and authentication. In an electronic marketplace, there is no face-to-face transaction in which security is ensured by the presence of both parties and authentication of the consumer involves personal recognition or quick verification of a corroborating piece of identification (i.e., a credit card or a driver's license). Rather, in an electronic arena, the consumer might live in one state or country, while the merchant resides in another, and the two parties never meet in person.

For an electronic marketplace to flourish, consumers and merchants must believe that information being exchanged between them is secure. They must also trust that the other party is legitimate. Moreover, each party must also have some assurance that the information received from the other party did in fact originate at the other party (and not an impostor) and that the information has not been subsequently altered or tampered with by an intruder. Accordingly, security, identification, authentication, and information validity are important to the full development and acceptance of an electronic marketplace. Furthermore, these capabilities must be readily portable by the end user in a manner which facilitates access to the electronic marketplace from a variety of locations.

Even outside of the commerce environment, the same themes of security, identification, authentication, and validity are becoming more important as reliance on computer networks increases. In modern network environments, identification and authentication are commonly used in access protocols aimed at preventing unauthorized users from gaining access to resources and services provided by the network. Typically, a user identifies himself or herself to a computer using a login dialog in which the user enters a descriptive and secret code name. The authentication process running on the computer validates the user based upon this confidential code name. Once validated, the user is free to roam the computer and network for resources and services. Unfortunately, the password authentication process often falls short of providing adequate security or user authentication. The password protocol, by itself, is well known to be weak and conducive to successful illegitimate attacks.

The problems inherent in password approaches has given rise to a variety of products which perform user authentication. Such products typically employ cryptographic technology in combination with hardware token devices. These token devices are typically pre-configured by the manufacturer and delivered to the user and replace the login password with a more robust and difficult to attack challenge-response protocol. While this technology is adequate for access control on an enterprise network (i.e., a local network for a business or other entity), it is not particularly scalable to public networks used by a large user population. This is the result of reliance on a centralized access control server which has knowledge of all the tokens issued to valid users.

Another problem which existing hardware tokens has been generation and management of key values. "Keys" are a numerical value, often expressed digitally as a number of bits, which are used in cryptographic algorithms that encrypt and decrypt messages. The keys are uniquely associated with a particular identity, such as a user or a computer. Configuring millions of devices, each with its own unique keys, would be a huge processing task for the manufacturer, resulting in a significant increase in the cost of the hardware device. From a security standpoint, another problem is that the manufacturer becomes a centralized point of attack in which bandits can covertly attempt to steal private key information. Another problem concerns replacement of keys. Once a key has exhausted it useful life, the manufacturer must either issue new devices with new keys or reconfigure old devices to change the keys. Once again, this is an extremely difficult, expensive, and inefficient task in a large scale system.

Accordingly, there is a need to develop an open identification and authentication architecture that does not rely on proprietary or customized hardware devices.

In addition to identification and authentication, the electronic arena also requires secure data transmission over an insecure public network (e.g., the Internet). Cryptography has evolved in the electronic setting as a means to securely transfer information over a communication system that is presumed to be insecure. Cryptography provides the necessary tools to digitally secure sensitive and valuable electronic messages in a manner that insures privacy between the sender and recipient of the communique, even though the message is subject to interception on the insecure communication system.

Through use of both public key (or asymmetric key) cryptography combined with secret key (or symmetric key) cryptography it is possible to address the above requirements. To initiate a secure electronic transaction between two individuals, one can use an authentication protocol based on public key cryptography. This protocol will result in the exchange of public key certificates and data encrypted with a private authentication key between the two users. The certificates contain a party's identification, the party's public keys (typically both a authentication or signature key and a key exchange key will be used), and is digitally signed by a trusted certifying authority. Upon receipt of the certificate, each party validates the certifying authority's signature (using their publicly available key). They can then use the public key in the certificate to validate the authentication data provided by the other party, which was encrypted with their private key. Once the validation is complete, they have high assurance they are in communication with the individual named in the certificate.

To securely exchange messages they can use a combination of both public and secret key cryptography. To send a secure message, the sender will generate a secret key and use this to encrypt the message using a secret key algorithm. Encryption transforms the message from plaintext into some meaningless ciphertext that is not understandable in its raw form and cannot be deciphered by an eavesdropper. The secret key is then encrypted using the recipients public key exchange key. Both the encrypted key and encrypted message are then sent to the recipient. Furthermore, to ensure that the message is not altered in any way, or replaced, the sender may also digitally sign the message using their private signing key.

Upon receipt of the signed encrypted message, the recipient first decrypts the secret key using their private key exchange key. They can then decrypt the message using the secret key and the same secret key algorithm which transforms the message from its ciphertext back to its plaintext. Only the recipient is presumed to have the ability to decipher the message since only the recipient has possession of its private exchange key. The recipient verifies the authenticity of the sender's digital signature using the originator's public signing key (which it received in the originator's certificate) to assure itself that the contents are from the legitimate sender and have not been subsequently altered.

Encryption, decryption, digital signing, and verification are therefore the principal cryptographic primitives that are used in an electronic network setting to facilitate the security, privacy, authenticity, and integrity of information being exchanged.

The secure information exchange is jeopardized, however, if the private keys are discovered through theft or user mishandling. The private keys must be kept confidential to ensure security. However, in the computerized network setting, there are potential hazards of using private keys in the cryptographic functions within available personal computers or workstations. Since the functions are carried out electronically, the user might assume the cryptographic routines are operating as expected, yet not be aware of ignorant or sophisticated electronic attacks. Careless applications might use cryptographic exchange or signature keys in ways that jeopardize the key's secrecy. Moreover, malicious applications might even deliberately compromise the user's secrecy, or worse, perform unauthorized cryptographic operations. For instance, a malicious application might attempt to decrypt the user's secret files and transmit them to some adverse party. Another situation might involve an application attempting to digitally sign notes or IOUs on behalf of the user without the user's knowledge or consent. A computer implemented cryptographic system must therefore provide the needed security to prevent attack from poorly devised or malicious applications.

Today, there are several electronic systems that provide cryptographic services in the computer forum. These include "Bsafe libraries" by RSA Data Security Inc., "X/Open CAPI", and "PKCS#". However, each of these systems permit direct access of the application to the keying material. There is no protection of these cryptographic resources from electronic attack. Furthermore, the Bsafe system, which is the most widely used cryptography system, directly attaches the cryptographic code to the application. There is no contemplation of protecting the keys from ignorant or malicious attacks from other software applications.

Accordingly, there is a need to a develop a system that empowers the user with the tools to securely store and manage cryptographic keys and certificates along with critical application data used with these assets to conduct electronic transactions. Simply keeping private keys stored in the user's computer may not adequately protect them from such malicious applications that attempt to locate and expose the user's private keys. Moreover, designing specific hardware/software solutions for every data exchange application is not particularly useful or workable for a broad public system with millions of users.

Ideally, it is desirable to develop a platform which supports a variety of different applications that a user might undertake. For instance, it would be convenient and efficient for the same platform to be used in conducting electronic commerce over a network, or authenticating a user for point-of-sale transactions, or managing a user's banking and financial matters, or any other electronic application. Most of these applications require access to the user's certificates and keys. However, these different applications typically involve interaction with different computers, such as the user's own computer, an employer's computer, a banking ATM, an electronic ticketing machine, and so on.

To support multiple applications, the platform must enable a user to transport certificates and keys from one application to another in a secure manner. This would permit the user, for example, to gain access to his/her bank accounts in a banking context, to exchange information with a colleague electronically over a public network in a secure manner, and to digitally sign a purchase order in an electronic shopping context. It is inadequate to transport the certificates and keys on a memory disk as theft of the disk would compromise the keys. Even encrypting the keys before loading them onto the memory disk would not prove helpful because the keys would eventually be decrypted at some time in the future to perform a cryptographic function. This always leaves a point where the private keys are available in unencrypted format and thus, exposed to copying or unauthorized use.

Accordingly, another design goal is to provide a multi-application platform which offers secure storage and transportation of private keys for use in different application contexts, without jeopardizing or exposing the private keys. Given these goals, there are countervailing concerns that any solution be cost effective, highly reliable, and difficult to compromise from a security standpoint, yet readily tailorable to a user's needs and preferences.

SUMMARY OF THE INVENTION

This invention provides a uniform platform for conducting electronic transactions in multiple different environments. The platform is based upon use of a portable, multi-purpose, integrated circuit (IC) card and complimentary computer software which enables user access and management of resources maintained on the IC card. The software runs oh a user's personal computer, empowering the user to initialize the IC card, configure the card with the resources that the user wants to maintain on the card, and to manage those resources. The software enables the user to generate private/public key pairs and establish or change passcodes for access to the card resources. The IC card itself provides the electronic vehicle for securely transporting the user's private keys and certificates without exposing them in plaintext form. The IC card is designed with enough processing capabilities to perform rudimentary cryptographic functions so that the private keys may be employed for signing, encryption, and decryption without ever being exported from the card.

More particularly, one aspect of this invention pertains to a system having a multi-purpose IC card, a card reader which interfaces with the IC card to transfer information to and from the IC card, and a computer coupled to the card reader to control the information transfer between the card reader and the IC card. As an example implementation, the system can be implemented as a home computer, equipped with a card reader, and a generic smart card owned by the user.

The system further includes various applications which execute on the computer, or more specifically, which run on the computer's operating system. For example, the applications might include a banking application, which organizes the user's finances in conjunction with a particular bank; or an electronic commerce application, which allows the user to shop and purchase products over a public network; or a travel application, which permits the user to make vacation reservations; or an entertainment application, which enables the user to purchase tickets for entertainment events; or a gatekeeper application, which oversees access onto the network of the user's employer. In any one of these contexts, the application might require access to certain resources maintained on the IC card.

The system further includes an application interface which executes on the computer to implement each application and to provide services which facilitate access to the resources on the IC card that are requested by the application. The application interface is preferably implemented as a service layer for the operating system, and is securely integrated with the operating system via mutual authentication procedures. The application interface supports three distinct types of services. These include (1) configuration services which permit a user to initialize and configure the IC card with those resources tailored to the user's preferences, (2) security services which enable access to the cryptographic functionality on the IC card, and (3) resource management services which permit the user to manage the storage provided by the IC card.

In one implementation, the application interface comprises a cryptographic services module and a card management services module. The cryptographic services module implements cryptographic functionality for the application. The cryptographic services module uses cryptographic resources maintained on the IC card and supplements this with software services. When the application requests a cryptographic function, the cryptographic services module communicates with the IC card to have the IC card support the cryptographic function. The IC card lends support without exposing the cryptographic resources maintained thereon. As an example, if the application requests a digital signature on a message, the application calls the cryptographic services module to hash the message to produce a digest and passes the message digest to the IC card. The IC card then digitally signs the digest using the user's private signing key and returns the signed digest to the application interface without exposing the signing key. The IC card can also assist in encryption, decryption, and authentication.

The card management services module implements the administration functionality for the application for managing resources maintained on the IC card. When the application requests performance of an administrative task on the IC card, the card management services module communicates with the IC card to perform the administrative task requested by the application. For example, the card management services module might support administrative tasks such as initialization of the IC card, generation of cryptographic keys, passcode configuration, and management of the IC card storage capabilities to hold certificates, and assets.

Another aspect of this invention is a card manager user interface (UI) which presents different graphical dialog screens to assist the user in managing her card resources. The card manager UI is very valuable from a usability standpoint. It provides a consistent presentation and method for managing the IC card resources which is independent of the applications being supported. The card manager UI allows the user to examine the resources of the card by using icon representations of the resources. The user can configure his/her card to add or remove resources simply by manipulating the graphical icons. The card manager UI also enables the user to initialize the IC card, and change passcodes for accessing the IC card.

Another aspect of this invention concerns the IC card itself. The integrated circuit (IC) card has a processor, a data I/O port controlled by the processor to receive and output data, a RAM, a ROM, and a programmable data memory is (example EEPROM or Flash memory). Such cards are available from multiple sources and in several form factors. Card-based software supports the functionality required, and interfaces, provided by the software running on the PC. This card software provides for programmable data memory partitioned into a public storage and a private storage. Confidential information, such as private keys, are maintained in the private storage. Non-confidential user information, such as standard medical data, can be kept in the public storage. The processor is configured to access the private storage of the data memory only after the processor verifies a passcode supplied by the user. Conversely, the processor is configured to access the public storage and output its contents without requiring receipt and verification of the user passcode. The partitioned storage and access protocol promote security of the cryptographic keys.

BRIEF DESCRIPTION OF THE DRAWINGS

The same numbers are used throughout the drawings to reference like elements and features.

DETAILED DESCRIPTION OF THE PREFERRED EMBODIMENT

The following discussion assumes that the reader is familiar with cryptography. For a basic introduction of cryptography, the reader is directed to a text written by Bruce Schneier and entitled "Applied Cryptography: Protocols, Algorithms, and Source Code in C," published by John Wiley & Sons with copyright 1994, which is hereby incorporated by reference.

Figure 1:
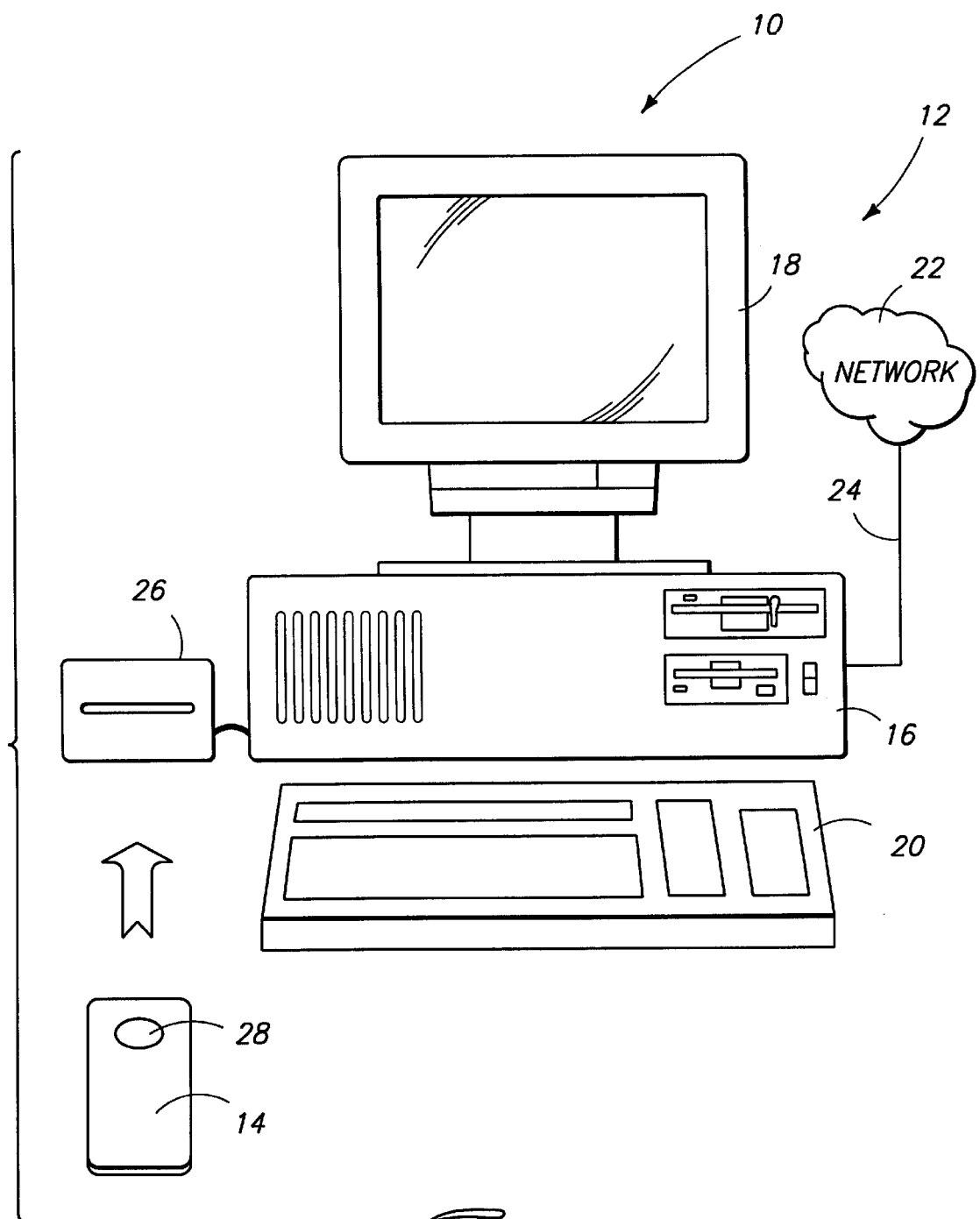
FIG. 1 is a diagrammatic illustration of a system having a network-attached computer with integrated circuit (IC) card and reader.

FIG. 1 shows a computer system 10 having a computer 12 and a multipurpose integrated circuit (IC) card 14. The computer 12 includes a central processing unit (CPU) 16, a monitor or display 18, and a keyboard 20 (or other input device). The computer 12 is connected to a network 22 via a cable or wireless connection represented by line 24. The network 22 can be a data communications network including a wire-based network, such as an enterprise network (e.g., a local area network for a business) or a public network (e.g., the Internet), and a wireless network (e.g., satellite network). The network 22 can also be implemented as a telephone network, or an interactive television network, or any other form for linking the computer 12 to an external source of information.

The IC card 14 is a portable card-like device with processing capabilities, allowing it to be used for many different purposes. In the illustrated implementations, IC card 14 is a smart card. A "smart card" is the approximate size of a standard credit card and has a built-in microcontroller (MCU) 28 which enables the card to modify, or even create, data in response to external stimuli. The microcontroller 28 is a single wafer integrated circuit (IC) which is mounted on an otherwise plastic card. A smart card is physically constructed in accordance with the international standard ISO-7816 which governs size and bendable limits of the plastic card, as well as size and location of the silicon integrated circuit. An example smart card implementation is described in more detail below with reference to FIG. 3. In other implementations, the IC card might be in the form factor of a PCMCIA card (i.e., PC card) or a floppy diskette, with one or more processing chips configured thereon. Accordingly, as used in this disclosure, the term "IC card" means a portable, low energy, electronic device with processing capabilities and memory. Such devices typically lack their own user interface (i.e., a keypad or display), but can be constructed with some user interface capabilities.

A card reader 26 is coupled to the computer 12. The card reader 26 interfaces with the IC card 14 (electronically, magnetically, RF, or otherwise) to transfer information to and from the IC card. In this implementation, the IC card 14 is physically inserted into a slot in the card reader 26 (as represented by the direction arrow). Interface pads on the card's MCU 28 make electrical contact with leads in the card reader, forming an electronic interface between the IC card 14 and the computer 12. Following a transaction, the IC card is removed from the card reader 26 and transported with the user. In other implementations, the card reader 26 might be implemented to communicate with the IC card 28 in a wireless or remote fashion without the physical coupling.

The computer 12 controls the information transfer between the card reader 26 and the IC card 14. The illustrated system represents a typical desktop computer that a user might use at home or work. The computer system might, however, be implemented in other forms with different appearances. For example, the computer 12 might be implemented as a PC-based point-of-sale machine or kiosk that is employed by merchants, or an automatic teller machine (ATM) used by banks, or a computerized vending machine, or an electronic ticket apparatus, or a set-top box. There are many different forms that the computer 12 might assume, with each possible computer implementation being capable of exchanging data with the IC card.

Depending upon the computer configuration and its operating environment, one or more software applications execute on the computer. A user's home or work computer typically executes many different applications. Conversely, a computer implemented as a kiosk, ATM, or vending machine might only execute one specific application. The applications typically run on an operating system that is executing on the computer 12. The operating system is preferably a disk-based graphical operating system, such as Windows® 95, Windows® NT, or other Windows®-compatible systems, although other operating systems can be employed, such as MS-DOS® or a customized operating system specially designed for a particular environment.

The multi-purpose IC card 14 contains various resources that might be used by, or in support of, an application executing on the computer 12. Among these resources are cryptography capabilities. The IC card stores public and private key pairs and can hold related data such as public key certificates. The IC card also performs rudimentary cryptographic functions, including encryption, decryption, signing, authentication. The IC card may also contain resources in the form of electronic assets, which represent value. For instance, the IC card might store assets in the form of electronic entertainment tickets, travel reservations, service contracts, medical prescriptions, government entitlement provisions, electronic a cash, public transportation tokens, and so on. With such diverse resources, the IC card 14 is capable of supporting multiple applications in different environments.

Before this invention, the IC cards have generally supported only a very limited set of applications, most commonly a single application, which were pre-programmed at time of manufacture. It has been tacitly assumed that the end user lacks the facilities to configure and manage the IC card. As a result, the user has needed multiple cards to support various applications. For instance, a user might have an access card that he uses to enter his work place, a bank card that he uses to access his bank account, a token card that allows him to ride public transportation, and so on. An aspect of this invention, however, is to provide both a multi-purpose IC card 14 which can be employed in many different environments as well as the tools which will allow the user to manage that card and its supported applications over time. The net result will be that the end user can do more while carrying fewer cards.

The multi-purpose IC card 14 provides a safe means for transporting the resources stored thereon. The IC card 14 can be physically ported with the user from place to place. The die design and fabrication processes used to manufacture the microcontroller IC yield a highly tamper-resistant card that is very difficult to reverse engineer and extract information. Thus, even if the card were lost or stolen, it is very difficult to obtain confidential information in the short time frame before the card is reported as lost and marked inactive. The IC card thus offers a secure storage and transportation mechanism for the cryptographic resources, and namely, the private keys.

The computer system 10 includes a software application interface which executes on the computer 12 to prevent possible covert attacks from malicious software applications which attempt to gain unauthorized access to resources on the IC card. The application interface implements the application and provides services which facilitate access to the resources on the IC card 14, without allowing the application itself to directly access the card-based resources. The application interface is implemented as a service layer for the operating system and is securely integrated with the operating system through mutual authentication. During initialization, the application interface and the operating system exchange certificates containing identifications (i.e., serial numbers or the like) which are signed by a trusted certifying authority (e.g., the manufacturer). The operating system and application interface then authenticate each other using the certificates. One technique for authenticating the various components in a computer system is described in a co-pending U.S. patent application Ser. No. 08/531,567, filed Sep. 13, 1995, entitled "Authentication System and Method for Smart Card Transactions." This application is hereby incorporated by reference.

The application interface is preferably an application program interface with a set of functional APIs that can be called by the application to support a particular functionality requested by the application. An example set of APIs are described below in more detail.

Figure 2:
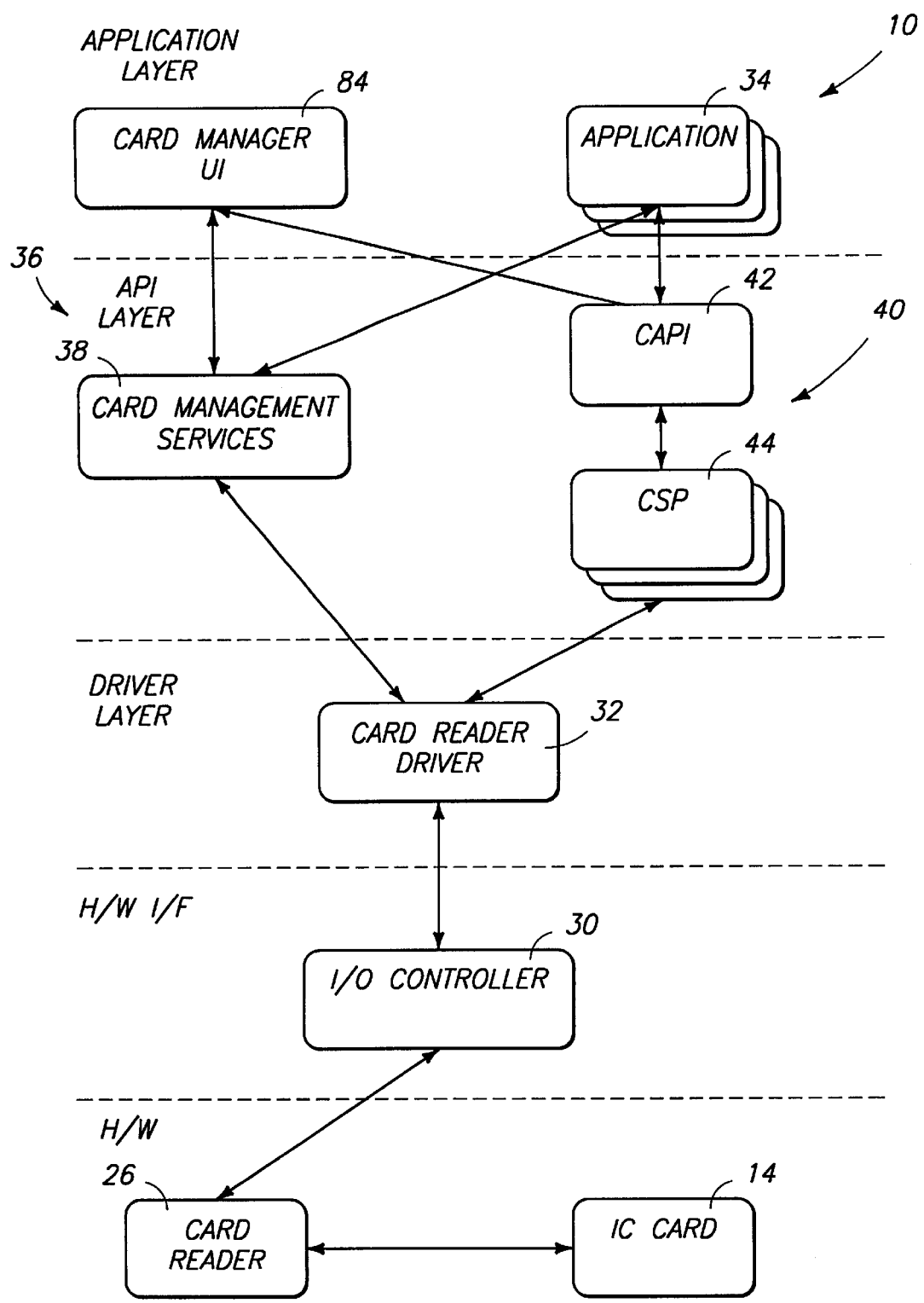
FIG. 2 is a block diagram of a software/hardware architecture for the FIG. 1 system.

FIG. 2 shows an architecture of the computer system 10. It generally consists of three software layers and two hardware layers. At the lowest hardware layer, there is an electrical interface (direct or remote) between the IC card 14 and the card reader 26. An I/O controller 30 is provided at a hardware interface layer to control the data transfer to and from the card reader. The I/O controller 30 is typically implemented as a control board resident in the computer CPU and connected to the CPU bussing structure. A software driver 32 defined by the operating system controls operations of the card reader 26 through the I/O controller 30.

The multiple applications, referenced generally as number 34, run on the operating system at a high level, application layer. The API layer, referenced generally as number 36, resides between the application layer and the driver layer. The application interface 36 is a service layer which supports three distinct types of services: (1) configuration services which permit a user to reconfigure the IC card with those resources tailored to the user's preferences; (2) security services which enable access to the cryptographic functionality on the IC card; and (3) resource management services which permit the user to manage the resources provided by the IC card.

The API 36 includes a card management services module 38 and a cryptographic services module 40. The card management services module 38 implements administration functionality for the applications 34 for managing resources maintained on the IC card 14. When the application requests that an administrative task be performed on the IC card 14, the card management services module 38 communicates with the IC card to perform the administrative task. As an example, the administrative tasks include initialization of the IC card, cryptographic key generation, passcode configuration, management of cryptographic keys on the IC card, management of certificates on the IC card, and management of assets on the IC card. The interface presented to the user by the card management services module is consistent and application independent for usability. An example set of API calls is described below in more detail.

The cryptographic services module 40 implements cryptographic functionality for the application 34 while using cryptographic resources maintained on the IC card 14. When the application 34 requests a cryptographic function, the cryptographic services module 40 communicates with the IC card 14 and works cooperatively with the IC card 14 to perform the cryptographic function without exposing the cryptographic resources maintained on the IC card 14. As an example, the cryptographic services module 40 supports the following requests from the application: generating one or more cryptographic keys on the IC card, retrieving the public component of a public/private cryptographic key pair from the IC card, adding a certificate (or other data resource) to the IC card, retrieving a certificate from the IC card, deleting a certificate from the IC card, generating a message digest based on an application supplied message, signing a message digest, encrypting data supplied by the application, decrypting data supplied by the application, verifying a signature supplied by the application, encrypting an encryption symmetric key for key exchange, decrypting a symmetric key supplied by the application. An example set of API calls is described below.

In the illustrated implementation, the cryptographic services module 40 comprises a cryptographic application program interface (CAPI) 42 which provides functionality to the executing application 34 and one or more cryptographic service providers (CSPs) 44 which implement the cryptographic functionality presented by CAPI 42 to the application 34. The CAPI layer 42 is thin. Its principal task is to select an appropriate CSP and verify its authenticity. When the application 34 needs a sequence of cryptographic functions to be performed (e.g., encryption, decryption, signing), the application invokes the CAPI 42 to acquire a context associated with the appropriate CSP. The CAPI 42 then loads the CSP and verifies its authenticity. Each CSP is digitally signed by a certifying authority using that authority's private signing key. A corresponding public signing key of the certifying authority is embedded in the CAPI 42 so that the CAPI 42 can verify the authenticity of the CSP 44 by validating the digital signature of the certifying authority. This verification prevents introduction of a foreign or impostor CSP.

The CAPI 42 also provides an insulating layer between the application and the CSP so that the application never has direct access to the CSP, but can only call to the CSP through the CAPI. The CAPI 42 is preferably implemented in software, which is stored in memory of the computer 12 and executed on the CPU 16.

The CSPs implement the cryptographic functionality requested by the application. In general, the CSPs perform encryption/decryption services, authentication, key exchange tasks, hashing routines, and digital signing. A different CSP can be configured to perform each of these functions, although a single CSP can be implemented to perform them all. Each CSP, or a dedicated CSP, can be configured to communicate with the IC card 14. The CSPs 44 are independent from, but dynamically accessible by, the CAPI 42 using conventional loading techniques.

The CSP is preferably implemented in software as dynamic linked libraries (DLLs). This implementation is advantageous because it can be easily invoked by the CAPI or by the application through the CAPI. Furthermore, the cryptographic functions can be changed or updated simply by replacing one or more DLLs. With the CAPI layer in between, the CSP DLLs can be replaced without affecting how the application interacts with them. Additionally, by packaging the cryptographic services in DLLs, it will be possible to change the strengths of the services as regulatory considerations change without impacting the higher level application.

A more detailed explanation of a cryptographic system which employs the CAPI and CSP architecture is found in a co-pending U.S. patent application Ser. No. 08/496,801, now U.S. Pat. No. 5, 689,565 filed Jun. 29, 1995, entitled "Cryptography System and Method for Providing Cryptographic Services for a Computer Application." This application was filed under the names of Terrence R. Spies, Jeffrey F. Spelman, and Daniel R. Simon and is assigned to Microsoft Corporation. This application is incorporated herein by reference.

The IC card 14 stores and manages the cryptographic keys and associated data resources used by the CSP 44 in performing the cryptographic function. The IC card 14 can also perform rudimentary cryptographic functions in support of the CSP 44.

An advantage of the FIG. 2 architecture is that the API 36 and IC card 14 offer a uniform platform which supports many different applications. Independent vendors can develop different applications which employ the services provided by the API 36, without needing to write hardware specific code for accessing the IC card. Additionally, the layered architecture and inherent tamper-resistance of the IC card promotes security of the private keys.

Figure 3:
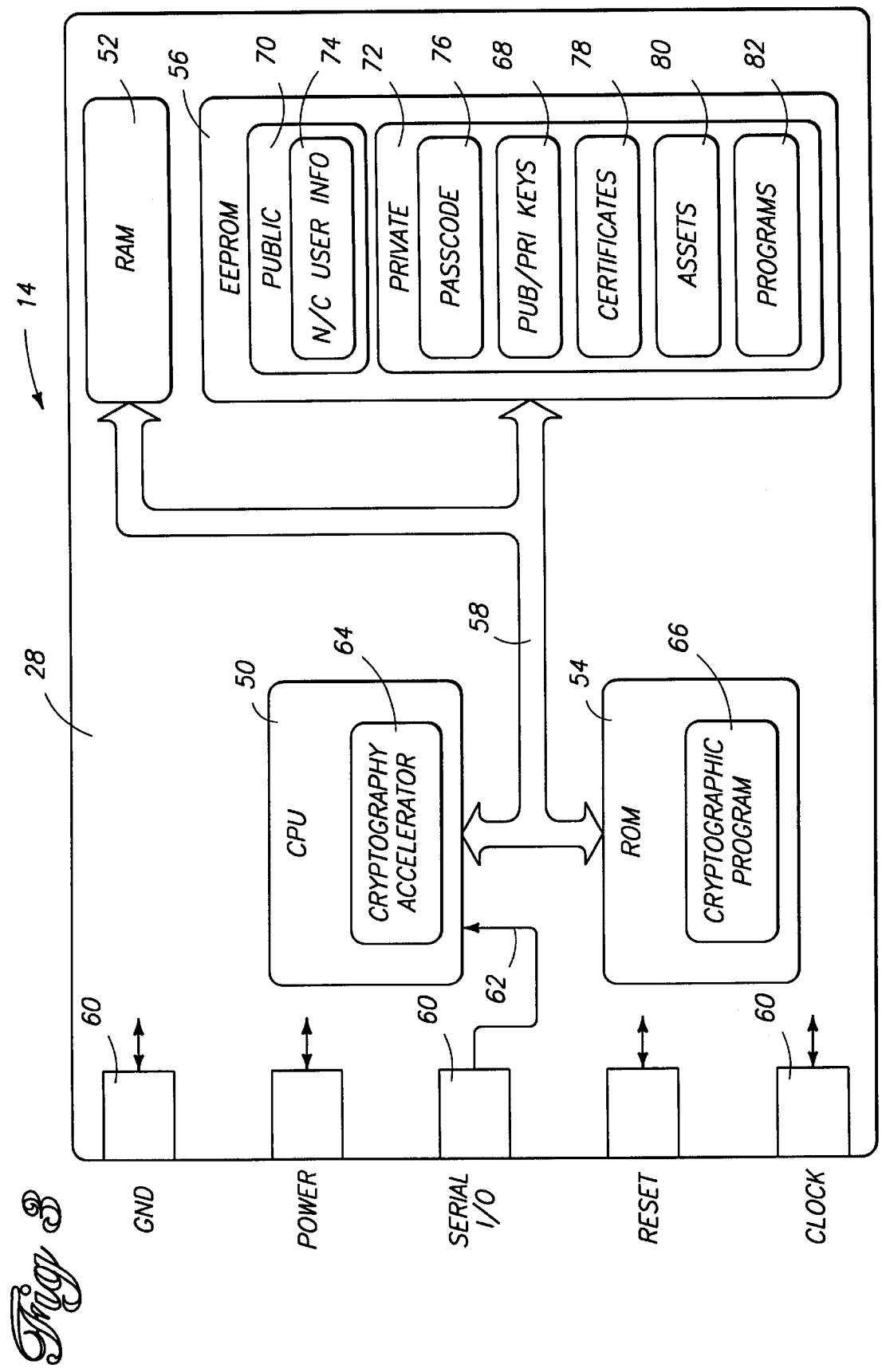
FIG. 3 is a block diagram of an IC card.

FIG. 3 shows the IC card 14 implemented as a smart card, and particularly, shows the microcontroller 28 of the IC card 14. The MCU 28 has a CPU or processor 50, a volatile rewritable RAM (Random Access Memory) 52, a ROM (Read Only Memory) 54, and an persistent reader/write memory such as EEPROM Electrically Erasable Programmable ROM) 56. A multi-bit bus 58 connects the components. Interface contacts or ports 60 are shown as an example coupling for an electronic interface. These include clock, reset, power, data I/O, and ground. Data is transfer is controlled by CPU 50 through serial I/O port 60 and conductor 62.

This invention includes implementation of system software, held in mask ROM, for IC cards such as those described above. This system software is designed to be tightly coupled with the cryptographic services and card administrative modules previously described to create a complete multi-application system. The IC card is configured with various cryptographic functionality to support the cryptographic services module 40 in the API 36. In the illustrated embodiment, the IC card 14 is configured with cryptography acceleration circuitry 64, shown integrated with the CPU 50, which streamlines cryptography computations to improve speed. The cryptography accelerator 64 can alternatively be implemented independently of the CPU. The ROM 54 stores a cryptographic program 66 which executes on the CPU 50 in conjunction with the cryptography accelerator 64 to perform certain cryptographic functions, including encryption, to decryption, signing, and verification.

The cryptographic program 66 can be implemented as one or more cryptographic service providers (CSPs) to perform these cryptographic functions. As an example, the cryptographic program 66 can encrypt and decrypt short messages using asymmetric key cryptography, such as RSA, and symmetric key cryptography, such as DES (Data Encryption Standard). The cryptographic program 66 might also be capable of generating and destroying cryptographic keys, such as symmetric keys used in the bulk encryption/decryption of a message. The symmetric keys are typically "sessional," meaning they are generated for each transaction and then subsequently destroyed.

The EEPROM 56 is partitioned into a public storage 70 and a private storage 72. The public storage 70 contains non-confidential user information 74, such as medical data or driver's license information. This information is distributed freely by the IC card 14, without any special security protocol or the need for the user to enter a personal passcode. The private storage 72 maintains information of which the user wishes to control distribution. The processor 50 only retrieves information from the private storage 72 upon authorization by the user as indicated when the user enters a personal passcode. This passcode is entered into the computer, passed through the card reader to the card I/O port, and on to the processor 50. The processor 50 compares the entered passcode to a passcode 76 stored in EEPROM 56, and permits access to contents stored on the private storage 72 if the two entered and stored passcodes match.

The private storage 72 of EEPROM 56 stores two asymmetric pairs of public and private cryptography keys 68—the signing pair and the exchange pair. One or more certificates 78 are also stored in the private storage 78. These certificates might contain a card ID, or user ID, public keys, and a signature of a certifying authority. One certificate might be used in a number of different applications, or alternatively, for only a specific corresponding application.

The IC card is designed to avoid exposing the private keys. The encryption keys are never directly accessible and the asymmetric private signing and exchange keys are not permitted to leave the IC card under any circumstances. In this manner, the IC card prevents a foreign application from ever inadvertently or intentionally mishandling the keys in a way that might cause them to be intercepted and compromised.

When an application 34 requests cryptographic functions, the IC card 14 works in cooperation with the CSP 44 to provide cryptographic functionality. The CSP performs most the of encryption and decryption processes which require greater computational resources. With present technology, IC cards in general cannot adequately perform full encryption/decryption of large size documents/messages due to I/O and processing limitations of the small microcontroller. However, the IC card can provide signatures and verification functions, and is capable of encrypting or decrypting small messages. As technology continues to evolve, it is expected that IC cards will have powerful and fast processors that can satisfactorily encrypt messages of any size and sign them within the context of the desired environment without noticeable or irritating delay.

With continuing reference to FIG. 3, electronic assets 80 are also stored in the private segment of the EEPROM 56. These electronic assets represent value, and might include tickets, tokens, e-cash, service contracts, medical prescriptions, reservations, government entitlements, or a pointer to a source of value. Non-cryptographic programs 82 that the user might wish to load onto the IC card are kept in the EEPROM 56. These programs can be complimentary routines that assist the applications running on the computer to organize or manipulate data and assets on the card.

Unlike prior art IC cards and readers which are factory configured and offer limited, if any, customization by the user, the computer system 10 permits the user to extensively configure the IC card 14 according to his/her preferences after the card has been issued. As shown in FIG. 2, the computer system 10 has a card manager user interface (UI) 84 executing on the computer CPU at the application layer. The card manager UI 84 presents a uniform set of graphical dialog screens which enable the user to conveniently and easily manage the card resources (including cryptographic resources, assets, etc.) from the computer.

Figure 4:
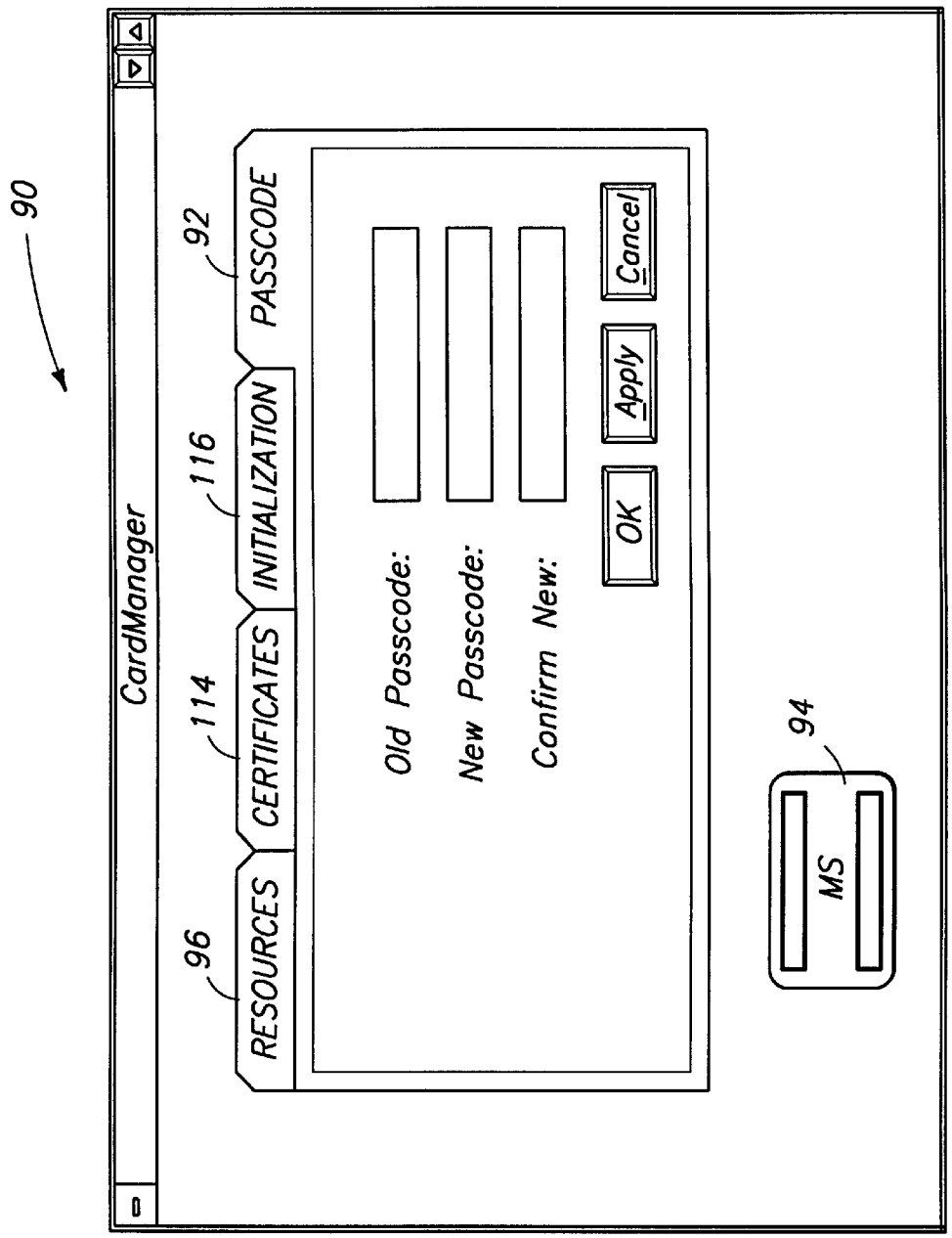
FIG. 4 is a diagrammatic illustration of a graphical dialog screen generated according card manager user interface executing on the computer.
Figure 5:
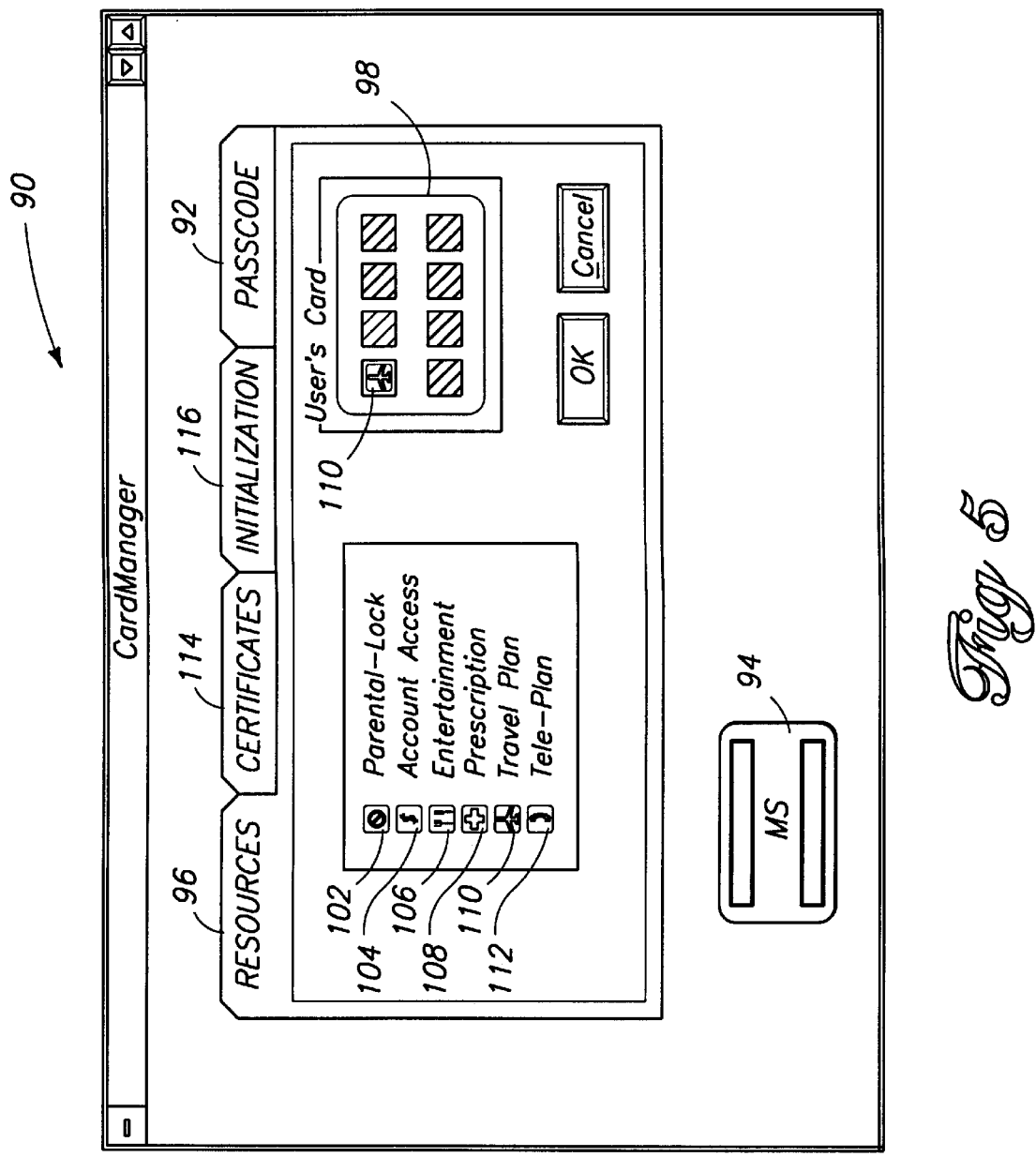
FIG. 5 is a diagrammatic illustration of another graphical dialog screen generated according to the card manager user interface executing on the computer.

FIGS. 4 and 5 show an example of a card manager graphical pop-up box 90 having different graphical dialog screens that are generated by the card manager UI and displayed to the user. FIG. 4 shows an example passcode dialog screen 92 which allows the user to change his/her passcode. To reach this screen, the user inserts the IC card into the card reader and enters the appropriate passcode to verify the user to the IC card. Thereafter, the user selects the card manager dialog box 90 and pulls up the passcode screen 92 to change the passcode, The user enters the old passcode, then the new one, and confirms the change. A card icon 94 along the bottom enables the user to select the appropriate IC card, in the event the user has more than one IC card that requires management.

When the user changes the passcode, the new passcode is passed to the card management services module 38 of API 36. This services module accesses the card and overwrites the old passcode stored in the EEPROM 56 of the IC card with the new passcode.

FIG. 5 shows an example resource management graphical screen 96 which is also part of the card manager pop-up box 90. The resource screen 96 provides a convenient interface that allows the user to manage the resources maintained on the card. The resource screen 96 presents a list 98 of resources that are presently is stored on the user's IC card and a resource list 100 of available resources that can be added to the card. The icons represent various resources, such as parental control features 102, financial account access 104, entertainment-related assets 106, medical information 108, travel reservations 110, and telephone assets 112.

The user manipulates the icons to add assets to, or remove assets from, the IC card. This can be done using a conventional drag-and-drop protocol where the user clicks on the desired icon using a mouse or other pointing device, and drags the icon to the appropriate location. For instance, the user can drag the travel icon 110 from the resource list 100 to the card list 98 to add this resource to the card. In the illustrated example, a travel-relate asset (i.e., ticket reservations) has been added to the user's card. The IC card is thus equipped with travel accommodations and the user can port the IC card to the airport to download this travel asset when checking in for the flight. Other task-oriented input protocols, in addition to the drag-and-drop protocol, can be used to manage the resources on the IC card.

When the user manipulates the resources on the IC card, the card management services module 38 performs the actual card maintenance. For instance, to add a ticket-related asset, the card management services module 38 downloads the new "ticket" (i.e., application defined electronic representation of the ticket) to the IC card which is stored in the EEPROM. As another example, to add new cryptographic resources, the card management service module 38 might reconfigure the processing capabilities of the IC card by updating or changing a stored programs kept in memory the IC card read/write memory.

The passcode screen 92 (FIG. 4) and the resource management screen 96 (FIG. 5) are shown for example purposes. There can be many other types of screens. For example, a certificate screen 114 permits the user to manage various certificates which have been issued for the public keys stored on the IC card and associated with various applications such as authentication, electronic payment, electronic travel, etc. An initialization screen 116 enables the user to initialize the IC card to an initial state. After initialization, the user can configure the IC card to his/her preferences.

With the use of the card manager UI, the multi-purpose IC card can be configured and managed by the user. Unlike prior art systems, which were proprietary and closed to user configuration, the computer system 10 promotes user controlled management of the card through the API 36 and card manager UI 84.

Figure 6:
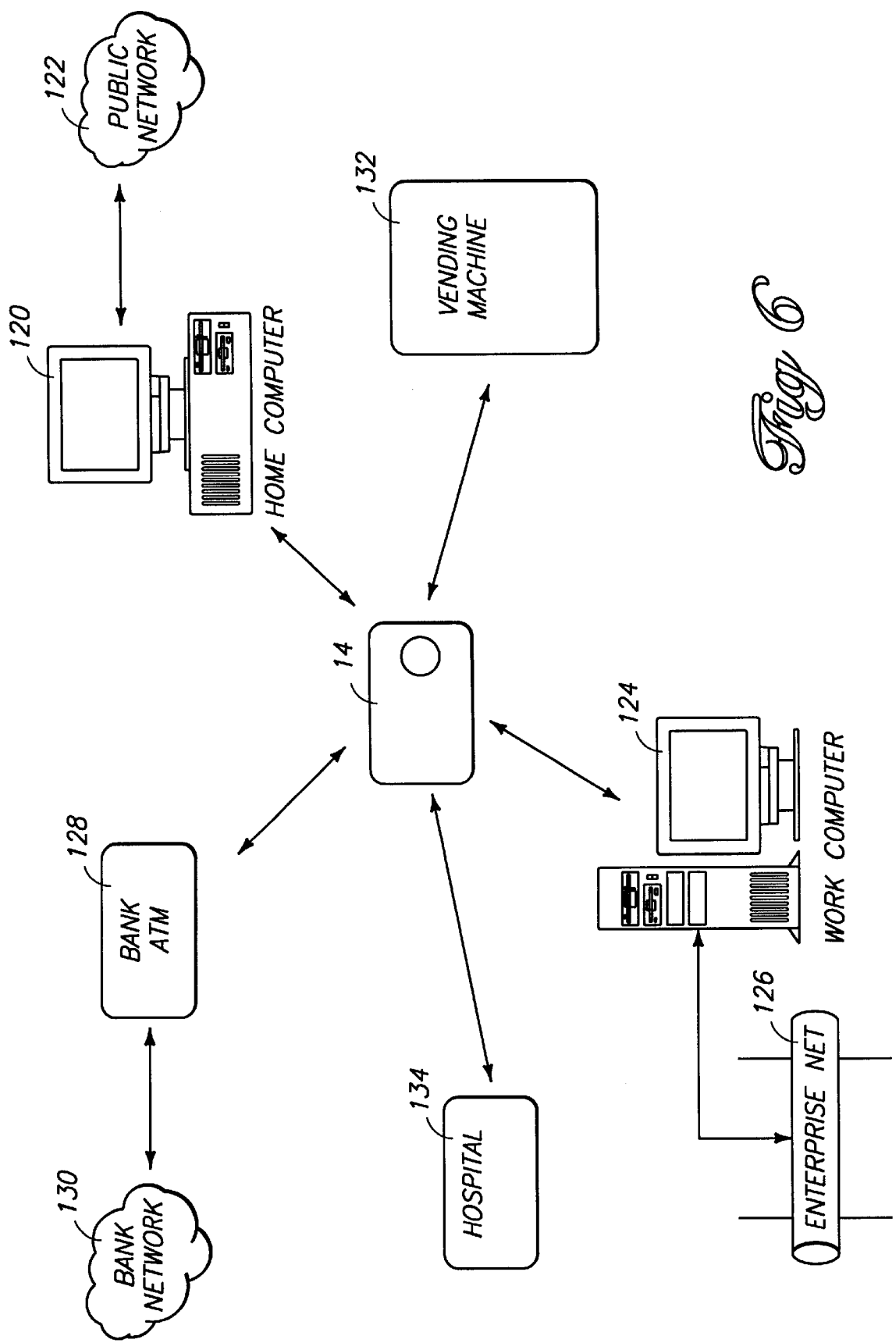
FIG. 6 shows a diagrammatic illustration of a card-based system which permits secure transportation of cryptographic keys, certificates, and digital assets from an application at one cite to another application at another cite.
Figure 7:
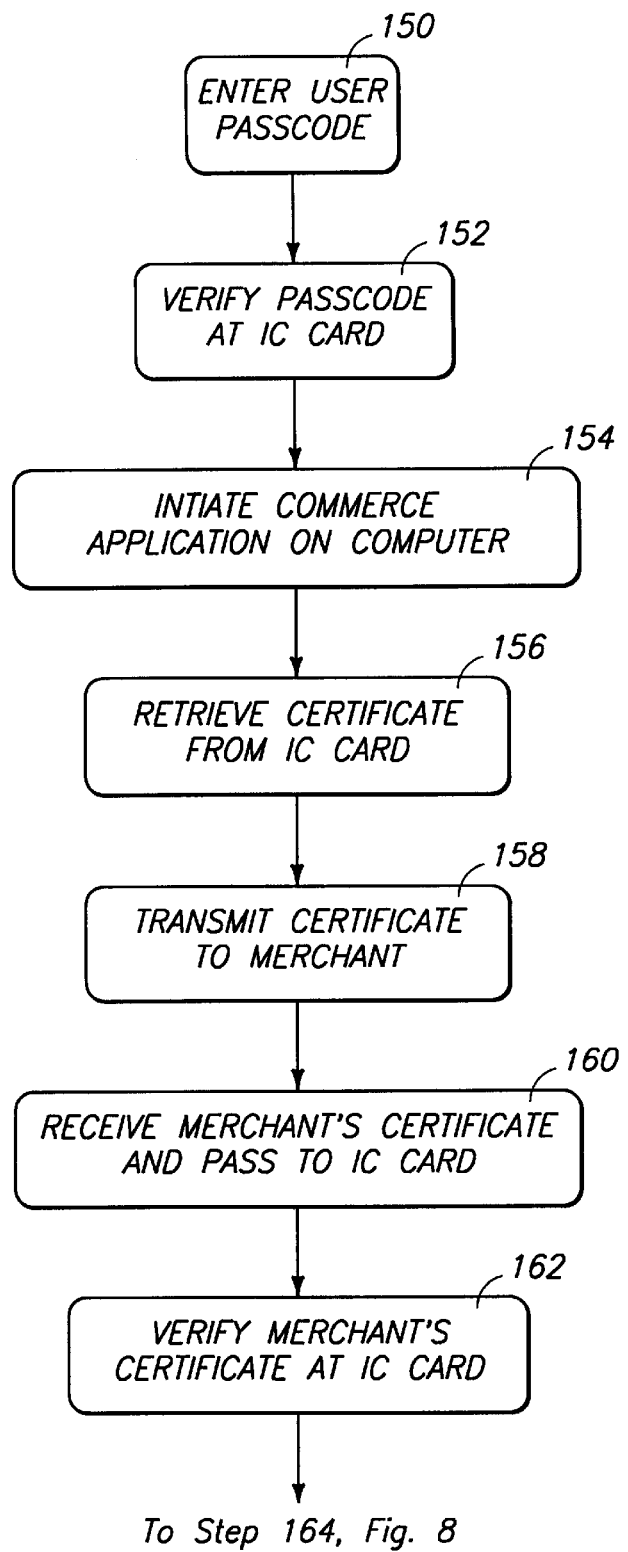
FIGS. 7–12 present a flow diagram of a method for conducting an electronic purchase transaction using the IC card-based system.

FIG. 6 shows an example illustration of how the IC card 14 is used for many different applications, while securely storing the resources on the card. In this example illustration, IC card 14 is configured with the user's medical information, financial data, work access account, tokens for beverage and snack vending machines, and various online service accounts including an electronic shopping account.

The user first inserts the IC card 14 into his/her home computer 120 for initialization and configuration using the card manager UI. Using the card manager UI, the user sets the IC card to an initial state in which the memory is cleared. The user then establishes one or more passcodes, which are stored on the IC card. Next, the user configures the IC card with certain resources to tailor the card to his/her preferences.

As part of the configuration, the cryptographic services module 40 of API 36 instructs the IC card processor 50 to generate a unique signing pair of public/private keys and a unique exchange pair of public/private keys. The user connects to a certifying authority via a public network 122 (e.g., the Internet) and sends identification information along with the public keys to the certifying authority. The certifying authority returns a certificate containing the identification information and public keys, and a signature of the certifying authority. The certificate is stored on the IC card 14.

Now suppose the user transports the IC card 14 to work. The user inserts the IC card 14 into his/her workstation computer 124 which is attached to the company network 126 (e.g., Ethernet LAN). The user enters the passcode to activate the IC card. The security application running on the workstation computer (or elsewhere on the network) then communicates with the IC card to verify the IC card (and hence the user) for access to the services on the network. The IC card might also wish to verify the authenticity of the security application. This can be done by exchanging authentication information between the security application and the IC card.

After work, the user ports the IC card 14 to a banking ATM 128 to withdraw cash. The ATM is an online computer attached to a proprietary bank network 130. The user inserts the IC card 14 into a card reader and enters his/her passcode (which could be different than the passcode used for work or home) to authenticate the user to the IC card. Next, the IC card and banking application running on the ATM exchange authentication information. The banking application then conducts a financial transaction through the API to the IC card. In the cash withdrawal operation, the IC card signs a request for cash using a private signing key on the IC card. The request is transferred to the ATM banking application through the API without exposing the signing key. The ATM then transfers electronic cash to the IC card 14 and debits the user's account. The electronic cash is stored in the private storage of the programmable memory of the IC card 14.

The user is free to spend the electronic cash on various goods and services, such as tokens for public transportation, food at a grocery store, and so on. As a further example, suppose the user decides to purchase a beverage from a vending machine 132. The user transports the same IC card 14 to the vending machine 132 and inserts it into a compatible card reader. The vending machine is an example of an offline computer, one that is not attached to a back end network. When the user selects the beverage, a vending machine application running on the vending machine requests through the API that the monetary equivalent of the cost of a beverage be withdrawn from the IC card 14. To access the private storage, the user might be requested to enter a passcode which is verified to the IC card. On the other hand, for such low cost items, there may be no need to verify the user via the passcode, or any other security protocol. The IC card 14 exports assets sufficient to pay for the beverage to the vending machine application, which then releases the beverage.

Now suppose on the way home, the user is injured and requires evaluation at a hospital 134. The IC card 14 can be accessed at the hospital to download the user's medical information from the public storage of the IC card's EEPROM. This can be done without requiring the user's passcode in the event the user is unable to function due to the injury.

After being released from the hospital, the user returns home. On doctor's orders, the user needs to purchase medical supplies to assist in the recovery. The user decides to buy the medical supplies from a merchant over the public network. The user inserts the IC card 14 into the home computer 120 and gains access to the public network 122. The user finds a medical supplies merchant and initiates an order using a shopping application executing on the user's home computer, or remotely from the merchant over the network. Authentication information is exchanged between the IC card and shopping application for mutual verification. The user then places an order, which is encrypted and signed, and sends the order over the network to the merchant. The encryption and signing functions are performed cooperatively between the IC card 14 and the API executing on the user's home computer, while using the signing and exchange keys kept on the IC card. The private keys are never exposed to the merchant application. The merchant decrypts the order and verifies the user's signature. If valid, the merchant ships the medical supplies and bills the user.

The FIG. 6 example demonstrates that the same IC card can be used in many different environments. Furthermore, the card can be easily configured to add additional capabilities as they come along. The IC card is a secure means for transporting the user's certificates, private/public key pairs, assets, and other information. Due to the sophisticated die processing techniques, the microcontroller die on the IC card is very difficult to reverse engineer, making it a very secure vehicle. The private keys are well protected. Moreover, the private keys never leave the IC card; rather, the complimentary API running on the computer facilitates data communication with the IC card to perform the cryptographic functions without ever exposing the private keys to the API or application.

Figure 11:
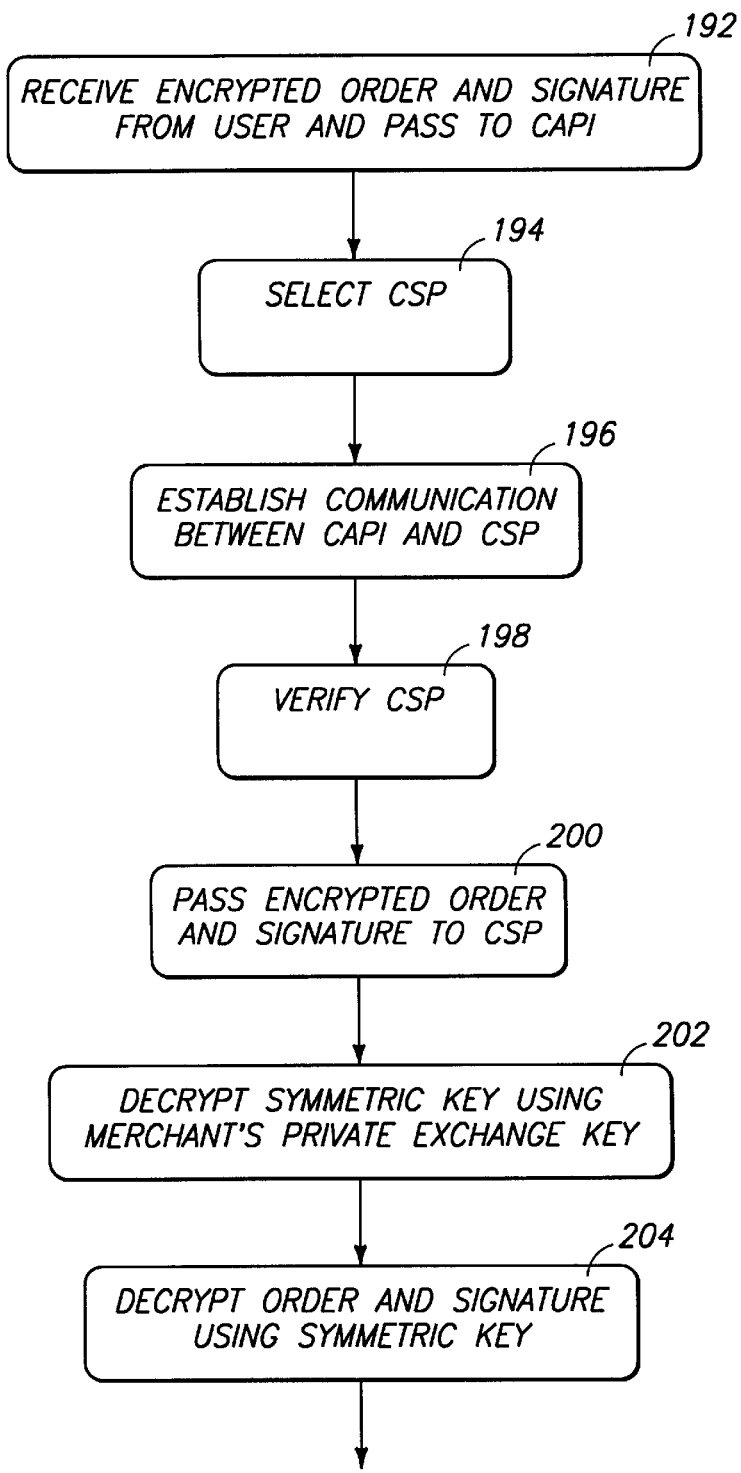
Figure 12:
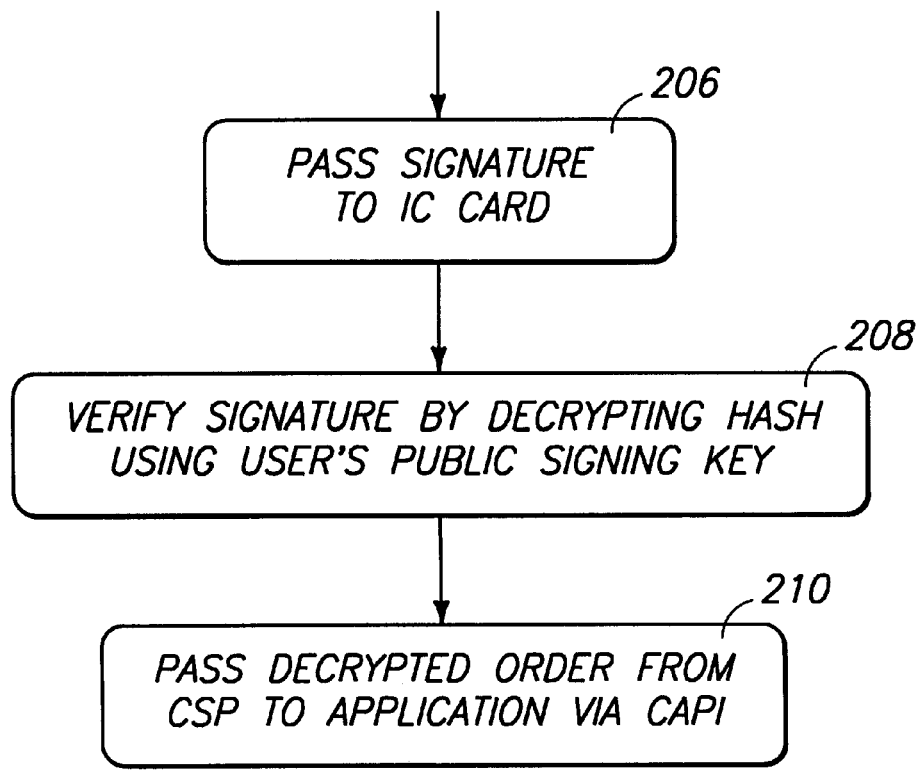

To further demonstrate how the IC card and computer-based API work together to protect the user's keys, the following discussion provides a detailed example of an electronic purchase transaction between a user or purchaser and a merchant. This example is described in reference to FIGS. 1–3 and to the flow diagram of FIGS. 7–12, where FIGS. 7–10 represent steps taken at the user's premises and FIGS. 11–12 represent steps taken at the merchant's premises.

To begin the process, with reference to the flow diagram of FIGS. 7–10, the user inserts the IC card 14 into card reader 26 of computer 12. This computer might be, for example, the user's home computer or a set-top box. The user enters a personal passcode which is passed to the IC card 14 for authentication (step 150 in FIG. 7). The IC card compares the passcode with one stored in memory for purposes of verification (step 152 in FIG. 7). If the entered and stored passcodes match, the user is presumed authentic and the IC card is prepared for interaction with a selected application.

Certificate Exchange

Suppose the user wishes to purchase a product from a merchant over a public data network, such as the Internet. The user begins a commerce application 34 on his/her computer which enables the user to browse and purchase goods from the merchant (step 154). For this example, assume that the. IC card 14 and the commerce application 34 have already mutually authenticated each other through the exchange of certificates.

When the user is ready to place an order, the user and merchant computers will first exchange certificates. These are validated and the public keys contained therein are used to enable a public key authentication protocol and to securely exchange symmetric key information if required to establish a secure communication channel.

The API card management services module 38 executing on the user's home computer instructs the IC card processor 50 to retrieve the particular certificate for this commerce application (may be in the IC card EEPROM 54, a hard disk, etc. (as there can be more than one certificate), and exports the certificate to the application 34 (step 156). The user's computer and the merchant's computing unit then exchange the certificates over the public network (step 158).

Upon receipt of the merchant's certificate, the commerce application submits the merchant's certificate through the card management and cryptography API 36 to the IC card 14 (step 160). The card processor 50 examines the signature on the certificate to verify that it belongs to the certifying authority in this context (step 162). If the certificate is valid, the merchant identifying information can be checked and the public keys used to authenticate the merchant using a challenge-response protocol.

Encryption and Signing

Figure 8:
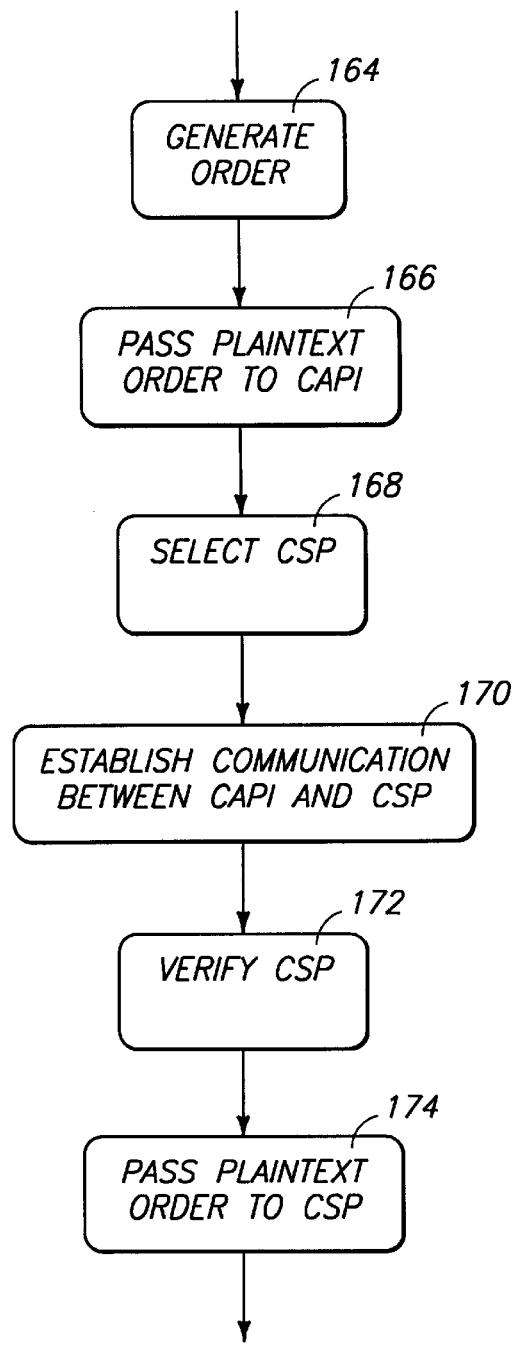
Figure 9:
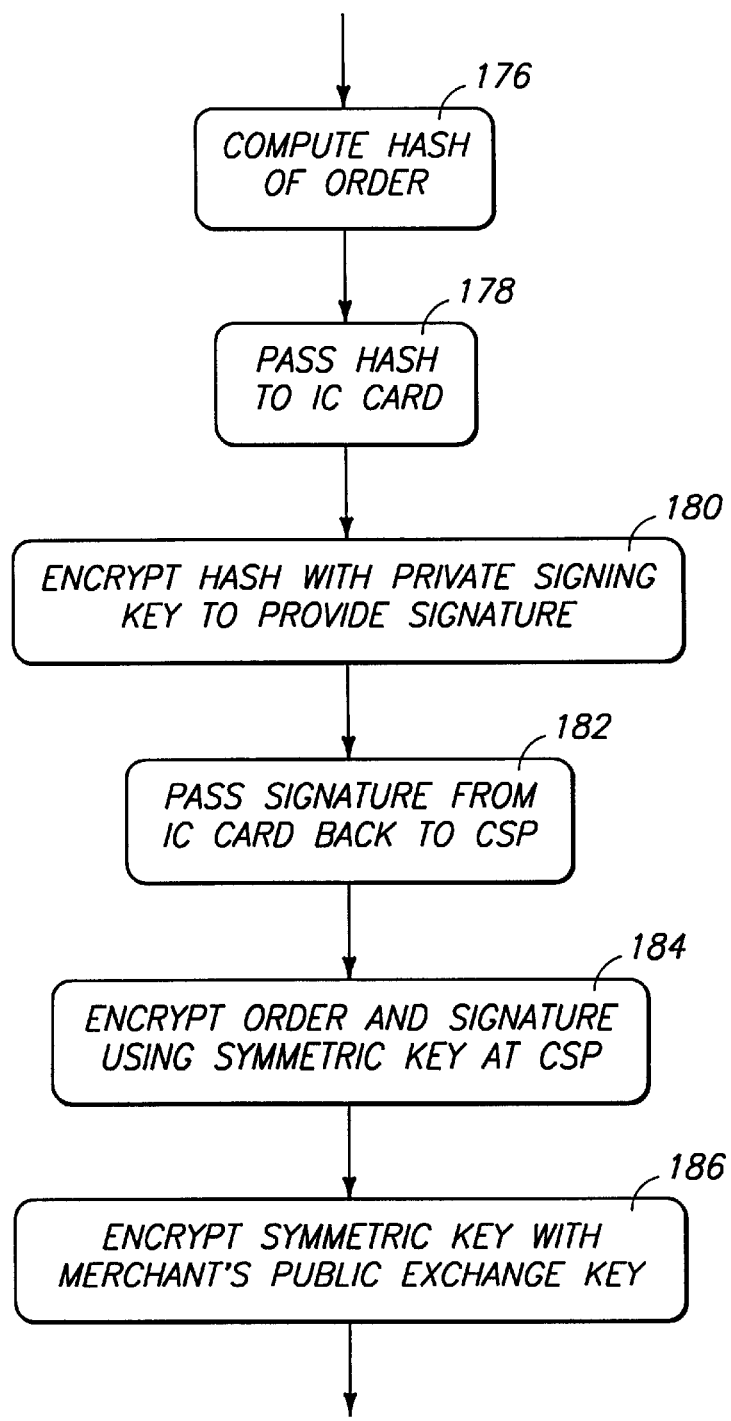

The commerce application generates an order, which is approved by the user (step 164 in FIG. 8). The order is encrypted so that it may be securely transmitted over the open and insecure public network. To perform the encryption, the commerce application 34 supplies a plaintext order to the CAPI 42 to be encrypted and signed (step 166). The CAPI 42 selects the one or more CSPs 44 to perform the encryption and signing (step 168 in FIG. 8). This entails loading the appropriate DLL, and performing a series of calls, such as calls to begin and end the encryption and to digitally sign the result. For purposes of continuing discussion, the operation will be described as if the CSP 44 is capable of performing all of the requested cryptography functions.

Communication is established between the CAPI 42 and CSP 44 (step 170 in FIG. 8). The CAPI 42 verifies the authenticity of the CSP 44 by validating the binding authority's digital signature attached to the CSP 44 using the binding authority's public signature key embedded in the CAPI 42 (step 172).

Once the CSP is authenticated, the CAPI 42 passes the plaintext order to the CSP 44 for encryption (step 174 in FIG. 8). The CSP 44 uses a hash function to translate the plaintext order into a cryptographic digest or hash (step 176 in FIG. 9). A hash function is a mathematical function that converts an input data stream into a fixed-size, often smaller, output data stream that is representative of the input data stream. The CSP passes the digest to the IC card (step 178). The card processor 50 digitally signs the cryptographic digest (hash) by encrypting the digest using the user's private signing key of the asymmetric key pair (step 180 in FIG. 9), as follows:

$$E_{Ksign.pri.user} \text{ (Order Hash)} = \text{Signature}$$

The signing operation employs an asymmetric key algorithm which involves two separate keys, one key to encrypt the hash (i.e., sign) and one key to decrypt the hash (i.e., unsign). The keys are based upon a mathematical relationship in which one key cannot be calculated (at least in any reasonable amount of time) from the other key. The private signing key is kept by the user on the IC card, while the public signing key is distributed in the certificate to the merchant. An example asymmetric cipher is the well-known RSA cryptographic algorithm named for the creators Rivest, Shamir, and Adleman.

The digital signature (i.e., signed hash) is returned to the CSP 44 (step 182) is and attached to the order. The CSP 44 generates a symmetric bulk data encryption key and encrypts the order and digital signature using the new symmetric encryption key (step 184 in FIG. 9). In a symmetric cipher, the encryption key can be calculated from the decryption key, and vice versa. In many cases, the encryption key and the decryption key are the same. The symmetric key must be known to both the sender and receiver, but otherwise kept secret. Once the symmetric key is divulged, any party can encrypt or decrypt messages. Example symmetric ciphers are a DES (Data Encryption Standard) encryption algorithm or an RC4 algorithm. The encryption of the order and signature is represented as follows:

$$E_{Ksym} \text{ (order+signature)} = \text{order.enc}$$

It is noted that the IC card 14 might perform the key generation function of generating the symmetric session key and exporting them to the CSP 44. Additionally, when processing capabilities of the IC card improve, the IC card itself might perform the bulk data encryption. After the order is encrypted, the CSP 44 encrypts the symmetric encryption key using the key exchange public key of the merchant that was originally received in the merchant's certificate (step 186), as follows:

$$E_{Kexchange.pub.merchant} (K_{sym}) = K_{sym}.\text{enc}$$

The asymmetric public/private exchange keys ensure that only the holder of the private key can decrypt a message that is encrypted with the corresponding public key.

Figure 10:
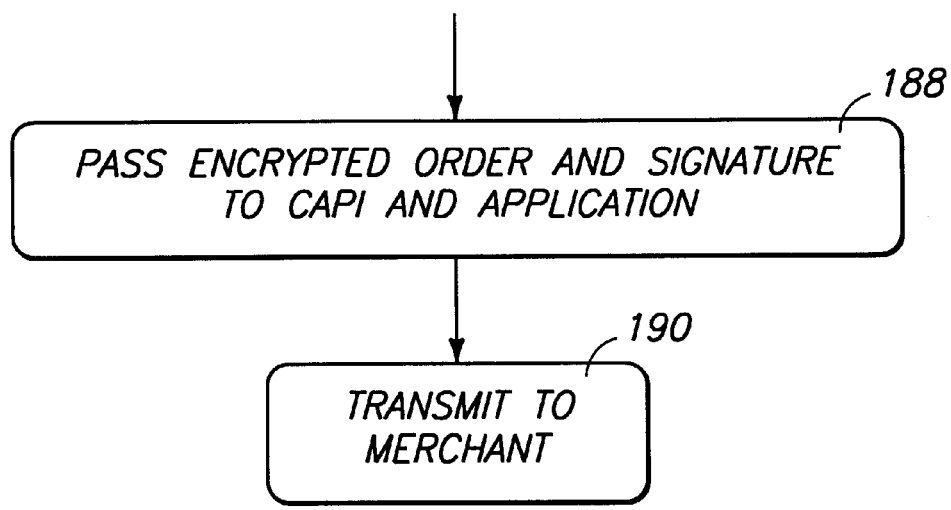

The CSP 44 returns the signed and encrypted order to the CAPI 42, which passes it onto the application 34 (step 188 in FIG. 10). The symmetric key is exported from the CSP in encrypted format, not in plaintext format. Furthermore, the asymmetric private signing and exchange keys remain permanently protected on the IC card and are not exposed to either the CSP or application. The order is then transmitted from the user's computer over the network to the merchant's computer (step 190).

Decryption and Authentication

With reference to FIGS. 11–12, the commerce application running at the merchant's computer receives the signed encrypted order and passes the package to its own API cryptography services module 40 (step 192 in FIG. 11). The encrypted order is supplied to the CAPI 42 for purposes of being decrypted and verified. The CAPI 42 selects the appropriate CSP or CSPs 44 to perform the decryption and verification (step 194). The appropriate CSP DLL is loaded and the application performs a series of calls to the DLL through the CAPI. Communication is established between the CAPI 42 and selected CSP 44 (step 196), and the CAPI 42 verifies the authenticity of the CSP 44 (step 198). Once the CSP is authenticated, the CAPI 42 passes the encrypted order to the CSP 44 for decryption (step 200). The CSP 44 decrypts the symmetric encryption key using the merchant's private key exchange key maintained on the merchant's IC card, or elsewhere (step 202 in FIG. 11), as follows:

$$D_{Kexchange.pri.merchant} (K_{sym}.\text{enc}) = K_{sym}$$

The recovered symmetric key is used to decrypt the order and user's digital signature to provide the plaintext order and the signed cryptographic digest (hash) (step 204 in FIG. 11), as follows:

$$D_{Ksym} \text{ (order.enc)} = \text{order+signature}$$

At this point, the CSP passes the cryptographic digest (hash) to the merchant's IC card (step 206 in FIG. 12). The merchant's IC card verifies the signature by decrypting the hash using the user's public signing key which was received in the user's certificate (step 208). If the decryption yields a result that compares bit-for-bit with an independently, locally computed hash of the entire message (computed by the CSP and passed into the IC card), the merchant is assured that the packet came from the user and was not subsequently altered. This decryption and verification of the hash can alternatively be performed by the CSP if the merchant does not employ IC cards. If valid, the plaintext order is returned from the CSP 44 to the CAPI 42 and then to the commerce application 34 (step 210). After the process is completed, the CSP destroys the symmetric encryption key that was employed for that session.

In compliance with the statute, the invention has been described in language more or less specific as to structure and method features. It is to be understood, however, that the invention is not limited to the specific features described, since the means herein disclosed comprise exemplary forms of putting the invention into effect. The invention is, therefore, claimed in any of its forms or modifications within the proper scope of the appended claims appropriately interpreted in accordance with the doctrine of equivalents and other applicable judicial doctrines.

What is claimed is:

1. A storage medium comprising:
    a plurality of executable instructions including at least a subset of which that, when executed, implement a user interface (UI) to present at least one graphical dialog screen on a display enabling a user to configure a communicatively coupled IC card and to manage one or more resources on the IC card; and
    wherein the UI utilizes one or more graphical icons to represent an associated one or more IC card resources.

2. A storage medium according to claim 1, wherein the UI enables a user to configure IC card resources after manufacture of the IC card.

3. A storage medium according to claim 1, wherein the executable instructions further comprise instructions for managing the one or more resources on the IC card via assistance of a complimentary computer program stored on the IC card.

4. A storage medium according to claim 1, wherein the at least one of the resources is associated with a telephone resource.

5. A storage medium according to claim 1, wherein the at least one of the resources is associated with a telephone resource that provides a computing device coupled to the IC card with user information.

6. A storage medium comprising:
a plurality of executable instructions including at least a subset of which that, when executed, implement a user interface CM to present at least one graphical dialog screen on a display enabling a user to configure a coimmunicatively coupled IC card and to manage one or more resources on the IC card; and wherein the UI enables a user to add and delete IC card resources by manipulating graphical icons associated with the IC card resources.

7. A computing device comprising:

the storage medium of claim 1; and a controller coupled to storage medium, the controller being configured to control data transfer to and from the IC card to implement the UI.

8. A computing device according to claim 7, wherein the controller downloads information from the IC card to configure the UI.

* * * * *